S. LICHTENSTEIN.
LAMP AND ROAD LIGHTING SYSTEM FOR AUTOMOBILES.
APPLICATION FILED JULY 2, 1917.
1,248,140. Patented Nov. 27, 1917.
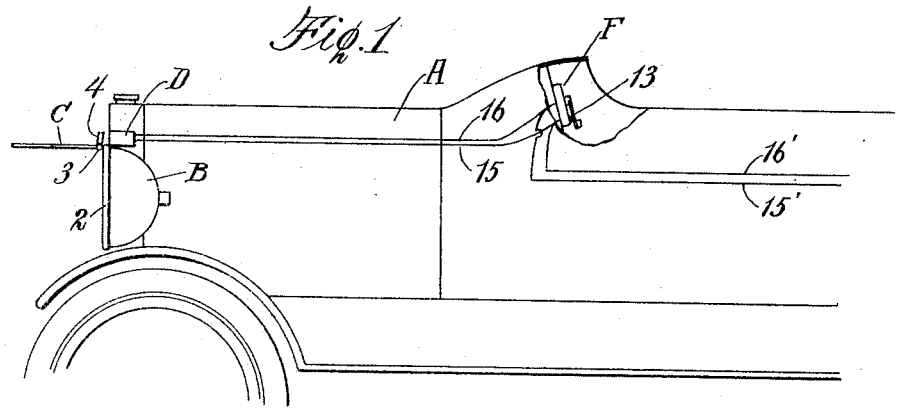
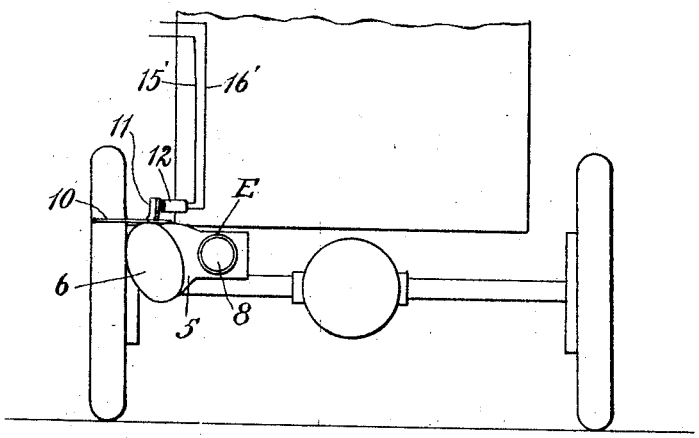
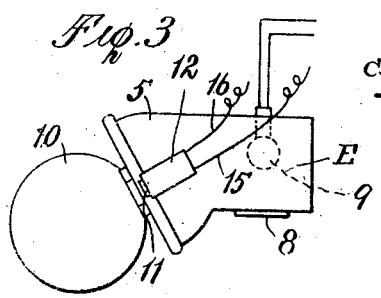
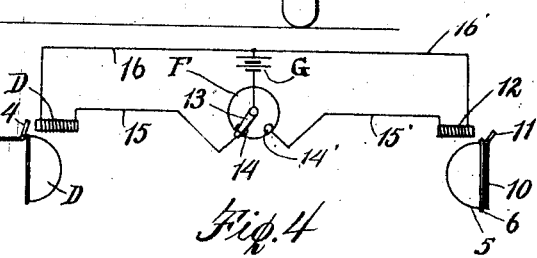
WITNESSES:
INVENTOR
Solomon Lichtenstein
BY
F. N. Gilbert
ATTORNEY

UNITED STATES PATENT OFFICE.

SOLOMON LICHTENSTEIN, OF BINGHAMTON, NEW YORK.

LAMP AND ROAD-LIGHTING SYSTEM FOR AUTOMOBILES.

1,248,140. Specification of Letters Patent. Patented Nov. 27, 1917.

Application filed July 2, 1917. Serial No. 178,093.

*To all whom it may concern:*

Be it known that I, SOLOMON LICHTENSTEIN, a citizen of the United States, residing at Binghamton, in the county of Broome and State of New York, have invented certain new and useful Improvements in Lamps and Road-Lighting Systems for Automobiles, of which the following is a specification.

My invention relates to improvements in lamps and road lighting systems for automobiles, in which the front lamps may be dimmed and at the same time a rear side light thrown upon the surface of the road, to light the way for a passing car, and it has for its object to provide a means under the control of the operator for simultaneously dimming the front head lights of the automobile and at the same time throwing a flood of light across the surface of the road from the rear of the car to light the way for an approaching automobile to make a safe passage.

With this object in view my invention consists in certain novel features of construction and arrangement of parts as will be hereinafter fully described and pointed out in the claims, reference being had to the accompanying drawings in which Figure 1 is a side view of an automobile, showing a part of my device.

Fig. 2 is a rear view of an automobile showing a part of my device mounted thereon.

Fig. 3; is a plan view of a part of my device.

Fig. 4: is a view showing the electrical system, controlling the operation of my device.

The same reference characters denote like parts in each of the several figures of the drawings. In carrying out my invention I have the automobile body A and mounted thereon I have the usual front lamps B, B: having lens 2: pivotally mounted or hinged on the upper surface of each of the lamp bodies B. B, I have a blind C or framed curtain formed of amber glass or other translucent material, adapted to hang in front of the lamp; projecting upward from the blind C, I have a lug 4; mounted at any convenient point on the front of lamp B, I have the magnet D; mounted on the rear of the automobile I have a lamp body E, having one part 5 projecting outward and downward diagonally from the front surface line of the remaining portion of the body, and which projecting portion or angle face 5 has a clear concentrating lens 6, while the other body part has an opening directly to the rear containing the usual ruby glass 8. Within said lamp body, I have the usual lamp 9, adapted to light both lenses; pivotally hinged or mounted on the upper surface of said angle portion 5 of the rear lamp E, I have also an opaque blind 10, and projecting from the upper edge thereof, I have a lug 11. Mounted on the upper side of the angle portion 5 of lamp E, I have the electromagnet 12, adapted to attract said lug 11. And I elect to cover said magnet and said lug, with a projecting hood or guard, of any convenient form. Mounted at any convenient point for operation within the automobile body A, I have the contact 2-point switch F and with the switch key 13 and contact points 14, 14'. Connecting between magnet D and switch point 14, I have the electric wire 15 and between magnet D and storage battery or other source of electrical energy G, I have wire 16: and between magnet 12 and contact switch 14' I have wire 15' and between magnet 12 and storage battery G, I have wire 16'. It is to be observed when running at night I have a switch 13 in contact with point 14, thus holding open the blinds on the front lamps. In the operation of my device, the switch 13 being in contact with point 14, the electromagnet D, draws to it lug 4 on blind C, and holding it in open position. Switch 13 being out of contact with point 14', the current disconnected from magnet 12, blind 10 is shut covering lens 6.

In operation when about to meet a car at night, I turn switch 13 out of contact with point 14 and thereby shut off the current from magnet D, and by gravity blinds C. C. drop over the lens 2 and at the same time by placing switch 13 in contact with point 14' the magnet 12 draws upon lug 11 and opens blind 10 and the light shines out through lens 6 lighting the roadway at and from the rear left side of my automobile, lighting up the roadway for the on-coming car, in the opposite direction. The switch being out of contact with either points 14 or 14' results in both front and rear blinds being closed. I however reserve the right to introduce other electromechanical detail devices for raising or lowering the curtains or opening and closing the curtains or blinds on the lamps.

Having thus described my invention what I claim as new and for which I desire Letters Patent is as follows:

1. In an automobile lighting system, a headlight, a rear lamp having two lenses, one a clear and concentrating lens to direct light to rear and side of the car, the other lens of ruby glass looking directly to the rear, a blind pivotally hinged on the head light to cover the opening therein, and a blind pivotally hinged on the rear lamp to cover the clear lens thereof, an operating lug provided on each of the blinds, an electro-magnet provided for the headlight, and an electro-magnet for the rear lamp to attract the lug of the blind to operate the blind, means for energizing the magnets, and a switch for controlling this means to alternately energize the magnets for alternately opening and closing the blinds at the front end and rear of the car.

2. In an automobile lighting system, a headlight and rear lamp having an opening to direct light downwardly and rearwardly of the car, and a ruby lens looking directly to the rear, means operably to dim the headlight and means normally closing the downwardly and rearward directing light opening of the rear lamp, means for alternately controlling said first named means to dim the headlight and open said second named means to give a downward and rearward light, and to give the reverse operation of the light controlling means.

In testimony whereof I have affixed my signature in the presence of two witnesses.

SOLOMON LICHTENSTEIN.

Witnesses:
 W. G. LICHTENSTEIN,
 W. C. BROWN.